United States Patent [19]

Dial

[11] 4,208,469
[45] Jun. 17, 1980

[54] FLOATING COVER ASSEMBLY

[75] Inventor: Howard S. Dial, Houston, Tex.

[73] Assignee: Gulf Seal Corporation, Houston, Tex.

[21] Appl. No.: 937,571

[22] Filed: Aug. 28, 1978

Related U.S. Application Data

[62] Division of Ser. No. 728,139, Sep. 30, 1976, Pat. No. 4,139,117.

[51] Int. Cl.$^2$ .......................... B32B 3/26; B32B 5/18; B32B 27/08; B32B 27/32
[52] U.S. Cl. ...................................... 428/315; 428/12; 428/516; 428/520
[58] Field of Search .......................... 4/172.12, 172.14; 220/216, 218, 221, 225; 428/315, 516, 520

[56] References Cited

U.S. PATENT DOCUMENTS

| | | | |
|---|---|---|---|
| 3,874,987 | 4/1975 | Young | 220/216 |
| 3,954,537 | 5/1976 | Alfter et al. | 428/310 |

OTHER PUBLICATIONS

Zimmerman et al., "Handbook of Material Trade Names", Supplement I, (1956), pp. 107–108, Pub. Ind. Research Serv., Inc., Dover, N.H.

Primary Examiner—William J. Van Balen
Attorney, Agent, or Firm—Pravel, Gambrell, Hewitt, Kirk, Kimball & Dodge

[57] ABSTRACT

A floating cover assembly encompassing in a first condition a method and apparatus for tensioning a floating cover for a liquid storage reservoir wherein the surface level of the stored liquid varies and in a second condition, a method and apparatus for maintaining a liquid storage reservoir. In the apparatus of the above inventions, a peripheral envelope formed at least adjacent a portion of the peripheral edges of the floatable sheet is adapted to be inflated with a compressible fluid, such as air, for proper tensioning of the sheet as the level of the stored liquid varies in the reservoir and for preventing wrinkling of the sheet while, in the second condition, the peripheral envelop is adapted to be filled with a non-compressible fluid for providing a ballast for the sheet during maintenance operations thereof while the sheet is inflatably supported for maintenance of the sheet and/or reservoir.

1 Claim, 11 Drawing Figures

FLOATING COVER ASSEMBLY

This is a division, of application Ser. No. 728,139, filed Sept. 30, 1976, now U.S. Pat. No. 4,139,117.

BACKGROUND OF THE INVENTION

The present invention relates generally to floating covers, particularly of the type to be used over large reservoirs.

Floating covers for contained fluids, generally speaking, are well known in the prior art. Some of this art is directed towards fluids contained within a tank or vessel rather than a fluid to be contained in a reservoir. Numerous patents such as U.S. Pat. Nos. 3,228,702; 1,775,758; 1,712,321; 3,343,708; 3,016,814 are directed towards providing seals for floating coverings that engage the sides of a suitable tank. Similarly, U.S. Pat. Nos. 3,159,301 and 3,557,994 are directed towards floating diaphragms adapted to be used in various pressure tanks. Other non-floating types of diaphragm covers for tanks are disclosed in U.S. Pat. Nos. 1,917,623 and 3,028,040. However, all of such prior art is directed towards floating structures that are contained within a substantially enclosed housing such as a tank or vessel. Such floating covers are not exposed to the adverse environmental conditions such as wind, ice and water accumulations on the surfaces thereof as well as the problems incumbent in providing floating structures for large expansive reservoirs rather than comparatively small storage tanks.

Floating covers, such as disclosed in U.S. Pat. Nos. 3,462,040; 3,592,009; and, 3,740,902, have long been in use. However, a recurring problem that has plagued reservoir covers of the prior art is how to control the tension of the floating cover on the fluid while accommodating fluid elevational changes in a reservoir having sloping or tapered surfaces adjacent reservoir peripheries. In U.S. Pat. Nos. 2,986,302 and 3,079,030, movable segmented sections are used to support the floating cover as the fluid level experiences elevational variations. U.S. Pat. No. 3,330,118 discloses the use of a plurality of circular floaters for supporting the cover of a sunken tank as the fluid varies in elevation while U.S. Pat. No. 2,970,716 uses multiple sections in combination with pontoons to support the floating roof for an oil storage reservoir.

U.S. Pat. No. 3,815,367 discloses the use of a complex tensioning line-arrangement for providing for the proper tension of a floating cover assembly for a reservoir to insure biasing thereof. Further, the present inventor disclosed in U.S. Pat. Nos. 3,313,443 and 3,667,641 floating cover arrangements which provide for a variety of drain configurations to prevent unwanted accumulation of liquid on the upper surface of such a liquid storage reservoir cover in an effort to prevent damage due to the weight of unwanted liquid on the upper surface of the cover and/or the detrimental environmental effects due to freezing and the like. Further, U.S. Pat. No. 3,736,754 discloses a combination two-cover assembly wherein one cover is used to float on the surface of the stored liquid while another roof is inflated thereover for protection of the floating roof. This dual roof assembly not only is expensive but requires maintenance on both the floating cover as well as the inflatable roof.

Not only is it important that a floating cover have the proper tension thereon to prevent damage thereto as a result of high wind and/or water accumulations thereon, but also it is important to provide for ease in reservoir maintenance thereof without necessitating removal of the cover. Typically, prior art repairs and other reservoir maintenance was accomplished by divers submerged in the reservoir fluid below the reservoir cover. However, no provisions are made in the prior art for providing an effective system of maintenance and repair of both the floating cover as well as the storage reservoir in combination with means for compensating for elevational changes of the fluid within the reservoir while providing the necessary tension on the reservoir cover.

Also, in the prior art, flexible and/or inflatable structures have been used for a wide variety of applications which include use in a variety of shelter or building configurations such as those disclosed in U.S. Pat. Nos. 3,924,363; 3,626,836; and 3,885,360 as well as an inflatable covering for swimming pools as disclosed in U.S. Pat. No. 3,918,221 and collapsible dams and damming methods as disclosed in U.S. Pat. No. 3,834,167.

Although these relate generally to inflatable structures, these are of little consequence in considering the requirements that must be met by a reservoir cover that must not only float on the surface of the reservoir fluid having a required tensioning thereof but also have appropriate provisions for ease in reservoir or cover maintenance.

SUMMARY OF THE INVENTION

The present invention relates to a new and improved floating cover assembly encompassing both methods and apparatuses for tensioning as well as maintaining a floating cover and a liquid storage reservoir wherein the surface level of the stored liquid varies. In a first embodiment, including a method and apparatus for tensioning the floating cover, the apparatus includes a flexible sheet adapted to be floated on the surface of the stored liquid. The sheet is formed having envelop means adjacent at least a portion of the peripheral edge thereof and adapted to be filled with a compressible fluid for tensioning the sheet to eliminate the formation of wrinkles in the sheet when floating on the surface of the level-varying liquid stored in the reservoir. In a second embodiment, including a method and apparatus for maintaining a liquid storage reservoir, the apparatus includes a sheet adapted to float on the surface of the stored liquid having envelop means formed with the sheet at least adjacent a portion of the peripheral edge thereof and adapted to be filled with a non-compressible fluid for ballasting the sheet during maintenance operations thereof and in conjunction with blower means operatively communicating with a chamber formed between the sheet and the storage reservoir for inflating the sheet to enhance ease of maintenance of the sheet and cleanout of the storage reservoir.

BRIEF DESCRIPTION OF THE DRAWINGS

FIG. 6 is a sectional side view of the floating cover assembly of the present invention having a center ballasted pneumatic support column;

DESCRIPTION OF THE PREFERRED EMBODIMENT

Figure 1:
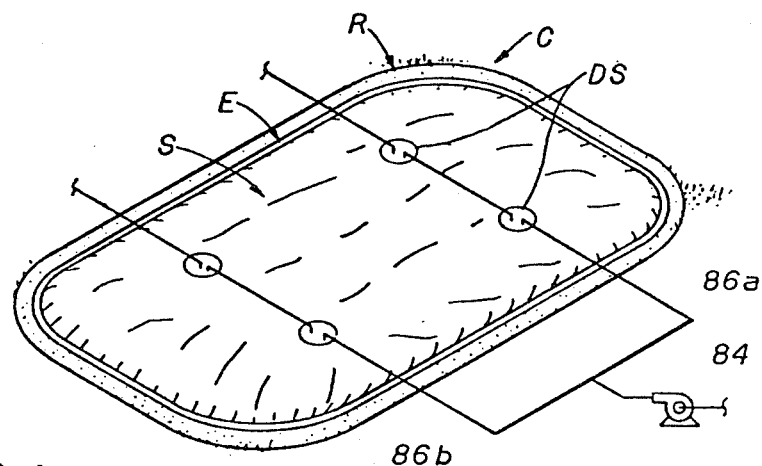
FIG. 1 is an isometric view of the floating cover assembly of the preferred embodiment of this invention.

Referring to the drawings, the letter C designates the floating cover assembly of the present invention. The floating cover assembly C includes a sheet S adapted to be secured to a reservoir R by securing means M with the sheet S having envelop means E formed therewith for covering the liquid storage reservoir R.

Figure 3:
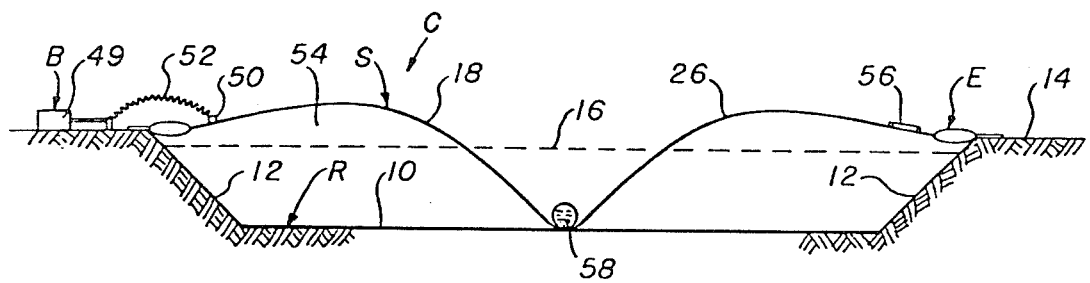
FIG. 3 is a schematic elevational view of the liquid storage reservoir having the floating cover assembly of one embodiment of the present invention therewith for maintenance of the sheet and/or reservoir.
Figure 4:
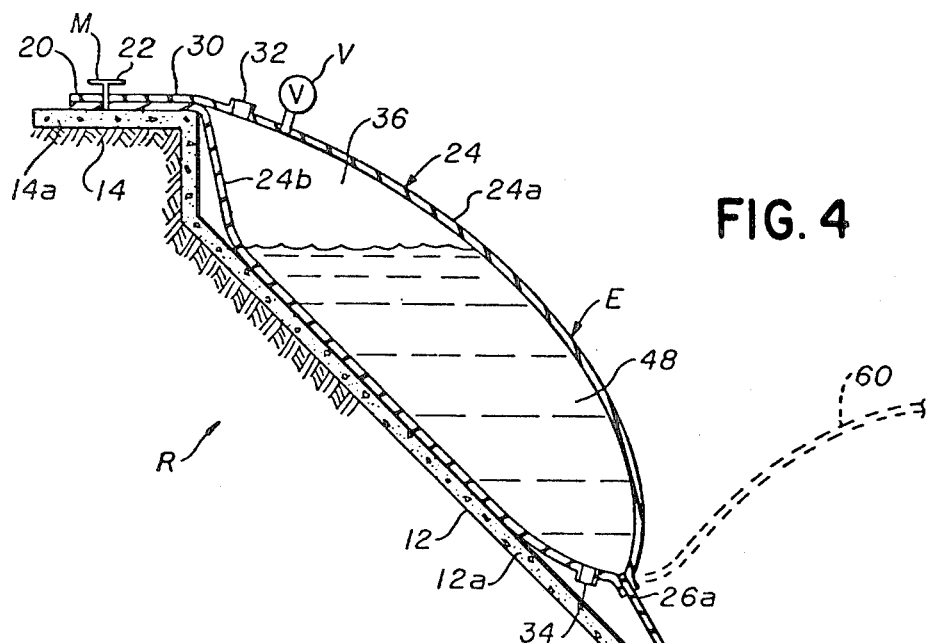
FIG. 4 is an elevational view of the floating cover assembly of the present invention showing ballasting of the sheet during maintenance operations.
Figure 5:
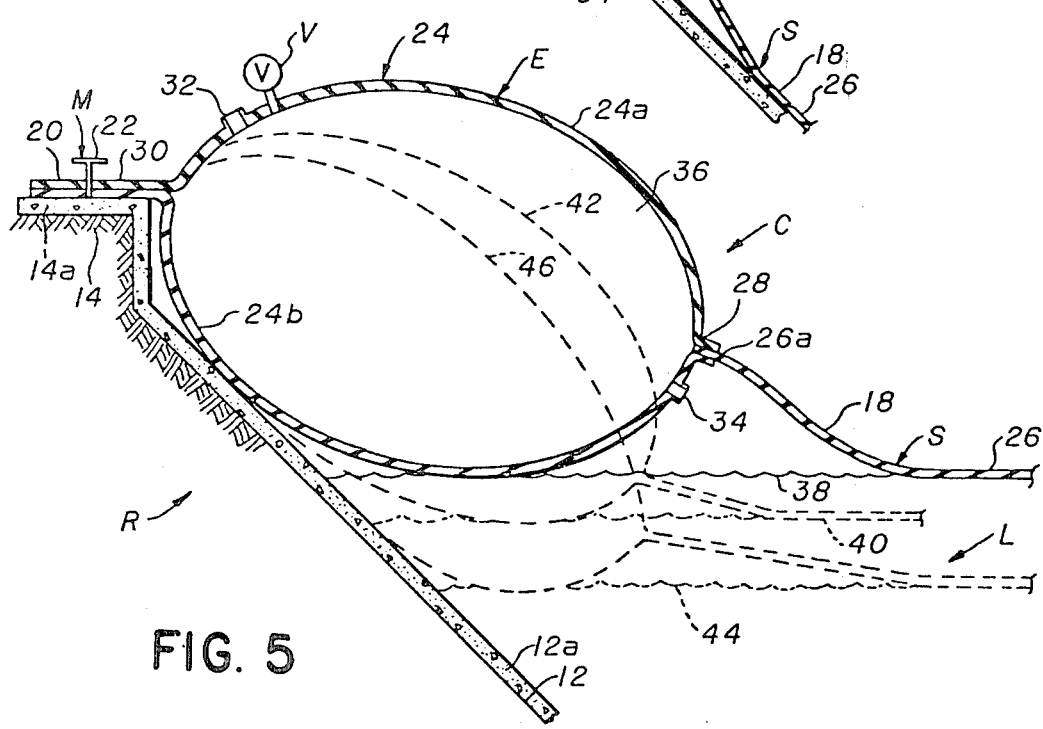
FIG. 5 is an elevational view of the floating cover assembly of the present invention, showing tensioning of the sheet to eliminate formation of wrinkles in the sheet when floating on the surface of the level-varying liquid stored in the reservoir.

The floating cover assembly C of the present invention is adapted to be used in conjunction with a liquid storage reservoir R. Such liquid storage reservoirs R are well known in the art and may be of a variety of sizes and shapes as well as types of construction. As shown schematically in FIG. 3, the reservoir R may be formed of an excavated portion of a tract of land such that the reservoir R includes a reservoir floor 10, side walls 12 and berm 14. Although the sides walls 12 are illustrated as being inclined, they may be arranged vertically or otherwise formed as desired. The reservoir floor 10, side walls 12 and berm 14 may be formed of earth as shown in FIG. 3 or may have concrete wrappers 10a, 12a, 14a, respectively (FIGS. 4, 5). Alternatively, the wrappers 10a, 12a, 14a may be of metal or any other suitable material. The reservoir floor 10 will ordinarily be flat as shown in FIG. 3 and additionally, the inner surface of the reservoir may be lined with suitable fluid-impervious material such as a liner (not shown) formed of a flexible sheet material such as a rubber-coated fabric, multi-ply butyl rubber, nylon, polyvinyl chloride, or the like.

The liquid L to be stored in the liquid storage reservoir R may be supplied to and withdrawn from the reservoir R by any suitable or conventional means (not shown) and will normally be maintained at a predetermined level no greater than the maximum level 16 (FIG. 3). The predetermined level may vary as described more fully hereinbelow. Such normal level variations will, of course, be determined by the anticipated supply and removal of the stored liquid L for which the reservoir R is provided and may differ in every installation.

Figure 2:
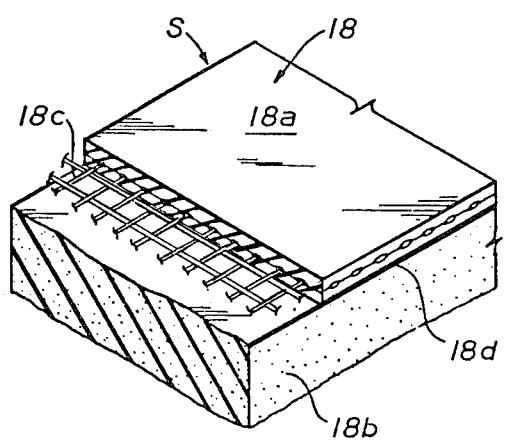
FIG. 2 is an isometric, sectional view of the sheet adapted to float on the surface of the stored liquid of the liquid storage reservoir, of the floating cover assembly of the present invention.

The cover assembly C of the present invention includes a sheet S. The sheet S is preferably formed of a flexible material which is impervious to the stored liquid L and will not be attacked by nor deteriorate in the presence of the stored liquid L in the reservoir R. Further, it is desired that the sheet S be adapted to float on the surface of the stored liquid L. Preferably, the sheet S may be formed of a laminated rubber or plastic cover material 18 as shown in FIG. 2. The laminated cover material 18 is preferably formed of an upper layer 18a and a lower layer 18b mounted therewith and which may be formed of different rubber or plastic materials. Preferably, the upper layer 18a is adapted to be exposed to the adverse environmental conditions surrounding the reservoir R, such as rain, wind, ice, heat and the like without deterioration thereof. Preferably, the upper layer 18a is formed of a material such as that sold under the trademark "Hypalon", by the Dupont Company, further having a reinforcement filament 18c formed of polyester to add strength to the upper layer 18a. "Hypalon" is a synthetic rubber in the form of a white, spongy, matted solid which is used as an elastomer for products which are resistant, unattacked by ozones and which have excellent color stability and resistance to heat, weather, and chemicals. Sulfochlorinated polyethylene (Hypalon) is obtained when a suspension of polyethylene in carbon tetrachloride is reacted with sulfuryl chloride or a mixture of sulfur dioxide and chlorine in the presence of pyridine. The commercial product, which contains 27.5% chlorine and 1.5% sulfur, is soluble in solvents such as tetralin. Sulfochlorinated polyethylene may be vulcanized when mixed with sulfur and diphenyl guanidine. These polymers are used as protective coatings in the chemical process industry. Preferably, the lower layer 18b is formed of a closed cell polyethylene foam with the lower layer 18b being laminated to upper layer 18a at interface 18d. As such, the lower layer 18b acts to floatably support itself as well as the upper layer 18a on the stored liquid L within the reservoir R. Typically, the stored liquid L is water, however, the reservoir R may contain oil, hydrocarbons or other liquids and consequently, the sheet S must be appropriately formed of a material that is not only impervious to the stored liquid L but also will float on such liquid.

The floating roof material 18 is selected and designed to be inflated as well as to float. The material must also be lightweight to balloon when inflated with a relatively low air pressure in the range of 1–3 lbs. per square foot. The continuous form layer will prevent a section of the roof to sink if the material 18 is inadvertently punchured and will also serve to insulate the water in the reservoir from undesired extremes of cold and heat.

The sheet S includes a peripheral edge 20 adapted to be secured to the berm 14 of the reservoir R by securing means M. The securing means M may include an appropriate cleat or fastener 22 which may be embedded in the concrete wrapper 14a of the berm 14 for securing the sheet S thereto adjacent the peripheral edge 20 thereof. The sheet S for the reservoir R should have an area which is greater than the area of the reservoir R where the securing means M for the sheet S are located.

The floatable cover assembly C of the present invention further includes envelop means E formed with the sheet S at least adjacent a portion of the peripheral edge 20 and preferably of the cover material 18. The envelop means E includes envelop 24 formed of an upper portion 24a and a lower portion 24b which preferably is formed of the same material as the laminated cover material 18. The envelop means E is preferably located adjacent the berm 14 of the reservoir R therebetween the peripheral edge 20 of the sheet S and the interior cover portion 26 at the marginal edge 26a thereof. It should be recognized that if there should be a portion of the sheet S not having an envelop means E therewith, then the marginal edge 26a of the sheet S will act as the peripheral edge 20 to be secured to the berm 14 and fasteners 22 therewith. Alternatively, if the envelop means E is in fact therebetween the marginal edge 26a of the interior cover portion 26 and the peripheral edge 20, then the envelop means E will preferably be formed as shown in FIGS. 4 and 5 of portions 24a, 24b. The upper portion 24a and lower portion 24b are appropriately affixed or bonded to the marginal edge 26a in fluid-tight engagement adjacent the bonding edge schematically represented at 28 (FIGS. 4, 5). Similarly, upper portion 24a and lower portion 24b of envelop 24 are bonded or suitably affixed theretogether in fluid-tight engagement adjacent the peripheral edge 20 at schematic location 30.

The envelop means E is further formed having at least one inlet port 32 and at least one outlet port 34. The ports 32, 34 are adapted to be opened and closed and in the closed position, provide a fluid-tight seal with the interior portion 36 of the envelop means E.

Valve means V is mounted with envelop means E preferably adjacent inlet port 32 in communication with the interior portion 36 of the envelop means E. The valve means V acts to regulate the amount of compressible fluid within the envelop means E as discussed more fully hereinbelow.

In the use or operation of one form of the cover assembly C of the present invention, the cover assembly C is to provide for proper tensioning of the floating sheet S wherein the surface level of the stored liquid in the liquid storage reservoir R varies. The sheet S is disposed on the stored liquid L in the reservoir R with the peripheral edge 20 being secured to the berm 14 of the reservoir R by securing means M and having envelop means E therewith at least adjacent a portion of the peripheral edge 20 of the sheet S. The envelop means E is adapted to be filled with a compressible fluid such as air, or any suitable gas, for expanding the envelop means E as shown in FIG. 5. The expansion or ballooning action of the envelop means E contracts the sheet S resulting in tensioning of the interior cover portion 26 to eliminate the formation of wrinkles in the sheet S when floating on the surface of the level-varying liquid stored in the reservoir R. Thus, the envelop means E is expanded in balloon-like fashion to result in a lateral tensioning force on the sheet S tending to stretch the sheet S outwardly whereby wrinkles and cavities in the surface of the sheet S will be reduced facilitating flow of rain and water from melting snow off of the sheet S towards an appropriate drain during adverse environmental conditions while also preventing pooling of fluid on the exterior surface thereof. The prevention of wrinkles results in facilitating the removal of any accumulation and retained liquid on the surface of the sheet S which helps facilitate the reduction of stresses and strains on the laminated cover material 18.

The envelop means E is inflated to a desired amount to insure such proper, lateral tensioning of the sheet S to eliminate the formation of wrinkles in the sheet S when floating on the surface of the stored liquid L in the reservoir R. As the liquid level varies, it may be necessary to add or remove compressible fluid from within the envelop means E. As shown in FIG. 5, the envelop means E is at a high level of stored liquid L as indicated at position 38. Should the stored liquid L level drop to that such as indicated as position 40, additional lateral tension is effectuated upon the sheet S. This increased lateral tension tends to flatten the envelop means E therefore increasing the pressure of the compressible fluid within the interior portion 36 of the envelop means E. Should this pressure increase overcome a predetermined pressure release setting within the valve means V, the valve means V acts to release the excess pressure in a "pop-off" valve fashion to effectuate release of such excess pressure build-ups within the envelop means E, but only reducing the pressure within the interior portion 36 to that of the predetermined amount.

Thus, with the envelop means E in a position such as that designated at 42 on stored liquid level indicated at 40, the internal pressure within the interior portion 36 is substantially the same as that of the envelop means E as positioned at the high level stored liquid position 38, while retaining substantially the same tensioning on the sheet S. This results in the sheet S being of substantially a uniform tension while the liquid level of the stored liquid in the reservoir R is of a changing nature.

Similarly, should the stored liquid L fall to a position indicated at level 44, the tension on the sheet S increases, further compressing the interior portion 36 of the envelop means E to such a position as noted at 46 wherein the valve means V again vents the excess pressure within the interior portion 36 such that the appropriate non-compressible fluid pressure within the envelop means E remains substantially the same to insure a proper tensioning of the sheet S as the liquid continues to vary. Should the liquid level rise from that of level 44 to that of level 40, it would be necessary to add or increase the amount of compressible fluid within the envelop means E by supplying such through inlet port 32 in an appropriate fashion to thereagain assure proper tensioning of the sheet S.

Figure 6:
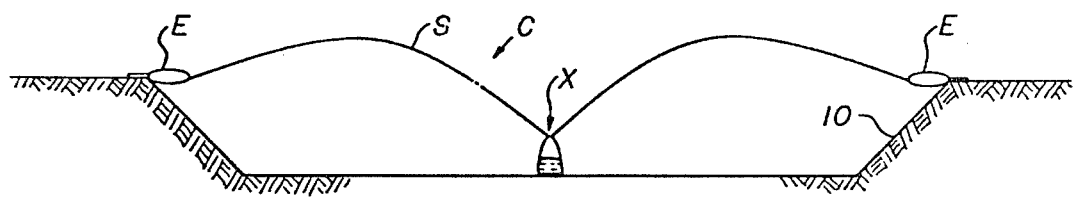
FIG. 6 is an elevational view showing plural envelop means of the floating cover assembly of the present invention.

Further, it should be noted that the sheet S may have plural envelops E about the peripheral edge thereof, shown schematically in FIG. 6 for sheets S having extremely large surface areas and where one envelop means E is not sufficient to provide the proper tensioning of such a sheet S.

The cover assembly C of the present invention may be effectively incorporated for properly maintaining the liquid storage reservoir R and sheet S for maintenance thereof should the reservoir R and/or sheet S require maintenance thereof. During such a maintenance operation, it is preferred that the reservoir R be drained of stored liquid L by any appropriate conventional means (not shown). Thereafter, the envelop means E, as shown in FIG. 4, is appropriately filled through inlet port 32 with any suitable non-compressible fluid 48 such as water, or any other desired fluid resulting in the envelop means E resting upon the concrete wrapping 12a of side walls 12 due to the weight of the fluid 48 within the envelop means E. Thereafter, blower means B, which may be of any suitable high-capacity blower 49 or the like, is connected with the sheet S by port 50 and flexible hose 52 therebetween such port 50 and the blower means B. The blower means B is appropriately energized resulting in the movement of compressible fluid, such as air, from the blower means B under pressure through the flexible hose 52 into port 50 and thereinto a cavity 54 formed therebetween the reservoir R and the lower surface of the sheet S, resulting in inflation of the sheet S which is heretofore unsupported due to the stored liquid having been drained. The blower means B results in the sheet S being inflated to permit inspection and repair of the sheet S and cleanout of the storage reservoir R. The envelop means E being filled with the non-compressible fluid 48 acts as a ballast about the peripheral edge 20 of the sheet S to prevent the sheet S from flapping in an unwielding fashion which could damage, tear, rupture and/or destroy the sheet S while being in such an inflatably supported position. It is desired that the sheet S be at substantially the same elevation as the berm 14 of the reservoir R to prevent any undue wind damage to the sheet S during such maintenance operations. The reservoir R and the lower surface of the sheet S may be accessed by an appropriate access hatch mounted with the sheet S. Thus, the sheet S and reservoir R may be duly inspected, repaired or otherwise maintained without the need of divers or other aquatic gear which has heretofore been the maintenance procedure of the prior art.

Should the sheet S be of a significantly expansive size, it may be necessary to provide one or more intermediate ballasts 58 to prevent the sheet S from extending significantly thereabove the berm 14 of the reservoir R which could cause wind damage to the sheet S. The intermediate ballast 58 may include one or more ballast arrangements of any suitable size, shape and/or weight in order that the sheet S may be kept substantially the same as that of the elevation of the berm 14 of the reservoir R. The intermediate ballast 58 is preferably of a plastic tube adapted to be filled with fluid such as water so that the ballast may be positioned, then filled with water during maintenance operations, and thereafter be drained to eliminate the need in moving heavy intermediate ballasts 58 about the sheet S prior to positioning same for proper maintenance operations.

The envelops E as filled with fluid 48 help to keep a proper tensioning of the sheet S while being supported by the fluid pressure generated by the blower means B and help to prevent damage to the sheet S in its expanded, inflatably supported configuration. For example, the sheet S as shown in FIG. 4, upon draining of the reservoir R, results in the sheet overlying the concrete wrapping 12a of the sloping sides 12 of the reservoir R whereinafter being inflated, the sheet S moves to a position such as that indicated by dotted lines at position 60 or in such a configuration as schematically shown in FIG. 3. Thus, the cover assembly C of the present invention provides for a method and apparatus for properly maintaining the reservoir R and sheet S during the maintenance operations thereof. After maintenance operations have been completed, preferably, the blower means B is removed and the non-compressible fluid 48 is drained from the envelop means E by means of outlet port 34 being released and/or the fluid 48 being pumped outwardly from the interior portion 36 of the envelop means E through the inlet port 32 and outwardly therefrom. Thereafter, the reservoir R is preferably again filled with liquid to be stored therein and the sheet S is thereafter tensioned by inflating the envelop means E of the sheet S with a compressible fluid to thereafter tension the sheet S as it floatably overlies the stored liquid L in accordance with the hereinabove described procedures to prevent the formation of wrinkles on the sheet S for protecting the same.

Thus, the cover assembly C of the present invention provides not only the means and method for appropriately tensioning a sheet S on the stored liquid L of a storage reservoir R but provides for ease of access, maintenance and repair of the sheet S and reservoir R during maintenance operations thereof.

Figure 7:
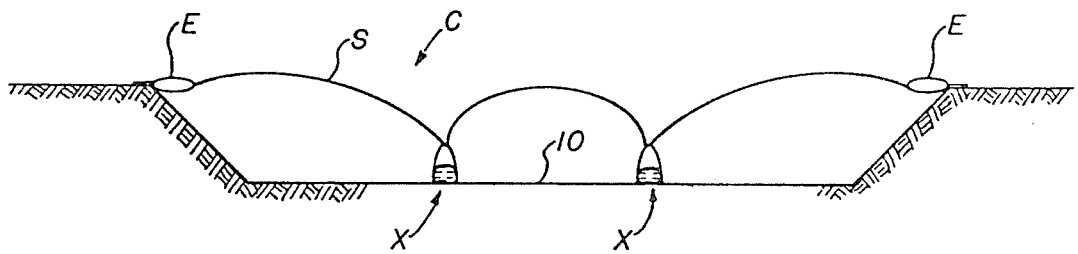
FIG. 7 is a view similar to FIG. 6 and illustrating a plurality of ballasted pneumatic support columns.
Figure 9:
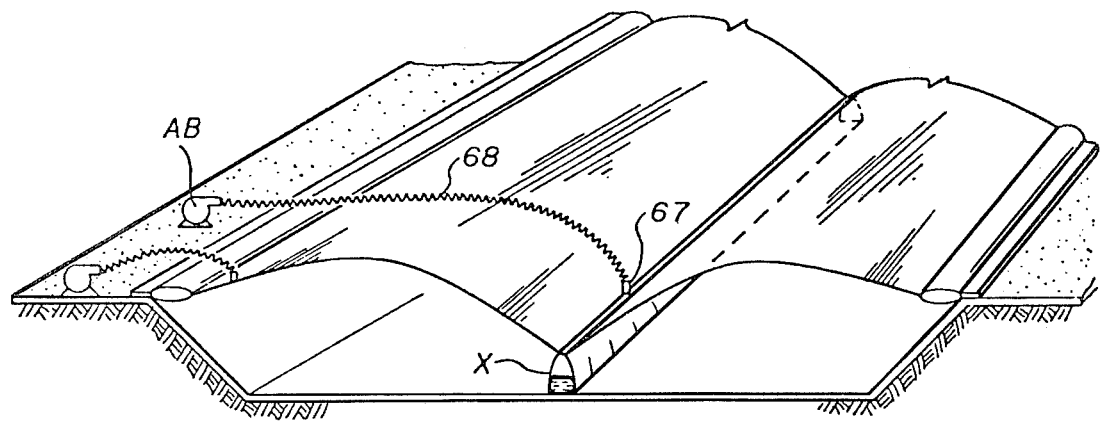
FIG. 9 is an isometric view of the floating cover of the present invention in the inflated condition.

Modified foam cover assembly of the present invention is illustrated as C-1 in FIG. 6 and 9 having a single center ballast pneumatic support column, generally designated X for both supporting and ballasting the sheet S when the cover assembly C-1 is in the inflated condition as illustrated. Another modified cover assembly C-2 is illustrated in FIG. 7 having a plurality of the ballasted pneumatic support columns X.

Figure 8:
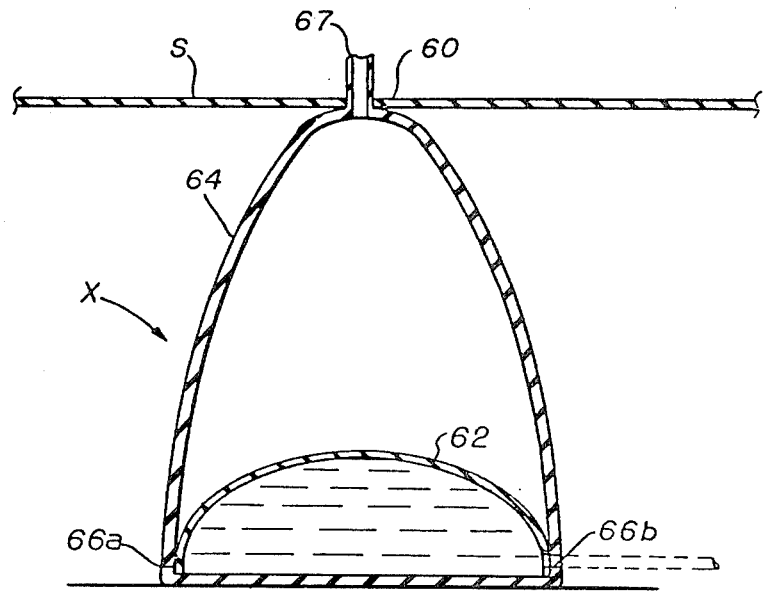
FIG. 8 is a sectional side view of the ballasted pneumatic support column.

As best illustrated in FIG. 8, the ballasted pneumatic support column X is secured to the underside of the sheet at 60. The support column X may be secured by sewing, glueing or the like and as illustrated, in FIG. 9 extends substantially across the reservoir R.

The pneumatic support column X includes a lower enclosed ballast chamber 62 and an upper pneumatic chamber 64. The lower or ballast chamber 62 is formed of a material impervious to water and preferably extends beyond the ends of the upper chamber 64 a short distance for a purpose to be described hereinafter. The upper chamber 64 is also formed of a flexible material and in addition to being secured with the roof S at 10 is secured on opposite sides of the lower tubular reservoir 62 at 66a and 66b. The flexible material 64 is preferably formed with a foam flotation characteristic in order that the sheet 64 will float adjacent the sheet S when the pneumatic support column is in the inoperative condition and the reservoir R is full of water. Suitable connections 67 are provided for communicating with a supply of air to an auxiliary blower AB as illustrated in FIG. 9. With the ends of the chamber closed pneumatic pressure in the support column X will be greater than that under the roof S and will tend to provide a support column at that point on the sheet S. The water ballast in the lower chamber will of course prevent the lifting of the sheet S and the pneumatic support column X from the floor 10 of the reservoir R.

It will be apparent to those skilled in the art that other means than those illustrated herein may be used to ballast the cover. For instance, the ballast chamber 62 may be attached to the cover by flexible lines or a single sheet of material which will enable the cover to inflate sufficiently to provide adequate worker access to the reservoir.

As mentioned previously the enclosed ends of the lower ballast chamber protrude slightly beyond the pneumatic support column chamber 64. This is done to provide access to the ballast chamber 62 for controlling the filling of the ballast. When the roof is in the normal operating condition floating on the liquid reservoir the foam cover 64 will pull the opening in the top of the ballast chamber 62 extending beyond the chamber 64 adjacent the sheet S. A zippered opening or access port in the sheet S is provided adjacent this fill point and when it is desired to maintain the reservoir using the pneumatic column X these access ports to be closed to contain the water normally present therein when the reservoir R is drained of the liquid L. When the sheet S is in the floating condition these ports are left open and the water is left free to flow in and out of the ballast chamber 62.

To prevent an undesired accumulation of rain water and the like on the upper side of the cover apparatus A one or more drain sumps DS may be provided as illustrated in 51. The drain sumps DS provide a gathering spot for the rainwater as well as providing for the elimination of the rainwater from the top of the cover where it could possibly contaminate the liquid L in the reservoir R.

Figure 10:
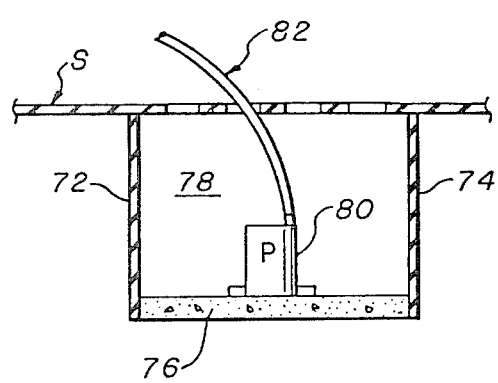
FIG. 10 is a sectional side view of a drain sump of the floating cover of the present invention.

The drain sump DS as best illustrated in FIG. 10 is provided with sides 72 and 74 made of impervious flexible material. The bottom or floor 76 of the drain sump DS is also made of impervious material and is preferably ballasted to hold the bottom 76 in a position below the sheet S in order that the water will drain into the pocket 78 formed by the drain sump DS.

To remove the rainwater from the pocket 78 of the drain sump DS a pump 80 may be positioned in the pocket 78 to remove the water preferably a submersible type electrically driven pump is used with electrical connection 82 being connected to a source of electrical power. Also, jet pumps or aductors may be employed as illustrated in FIG. 1.

In FIG. 1 a source of fluid under pressure is provided such as by pump 84 is separated into two flowlines 86a and 86b.

Figure 11:
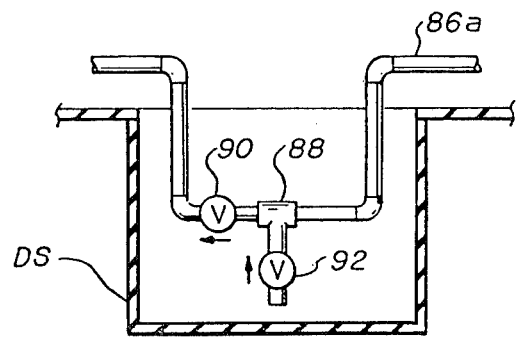
FIG. 11 is a sectional side view of another form of drain sump.

As illustrated in FIG. 11 the conduit 86a extends outwardly on the cover S until it reaches drain sump DS. An aductor or jet pump is connected into conduit 86a in the drain sump DS. The aductor 88 discharge may then be run to the edge of the reservoir to a discharge location or it may be run to another drain sump as illustrated in FIG. 1. The aductor 88 is provided with a suitable backflow valve 90 in the conduit 86a and a foot valve 92 on the inlet of the aductor 88 for the fluid to be evacuated from the drain sump DS. Such arrangement of using a jet pump is old and well known to those skilled in the art.

The foregoing disclosure and description of the invention are illustrative and explanatory thereof, and various changes in the size, shape and materials as well as in the details of the illustrated construction may be made without departing from the spirit of the invention.

I claim:

1. A lightweight laminated flexible floating cover material for floating on a liquid stored in a storage reservoir or ballooning when inflated with a relative low pressure of 1–3 pounds per square foot to provide access to the storage reservoir, comprising:

a reinforced upper layer formed of a sulfochlorinated polyethylene adapted to be exposed to adverse environmental conditions without deterioration thereof, said upper layer having a flexible polyester reinforcement to add strength to said upper level;

a lower layer formed of a closed cell polyethylene foam laminated with said upper layer and in contact with the stored liquid, said lower layer capable of floatably supporting itself and said upper layer on the stored liquid without deterioration of said lower layer and capable of insulating the stored liquid from adverse environmental conditions; and said laminated upper and lower layers formed of lightweight flexible material for ballooning above the reservoir when the cover material is inflated with a relative lower pressure of 1 to 3 pounds per square foot to provide maintenance access to the storage reservoir.

* * * * *